US012592129B2

(12) United States Patent (10) Patent No.: US 12,592,129 B2
Boese et al. (45) Date of Patent: Mar. 31, 2026

(54) ELECTRONIC GAMING MACHINE WITH SYMBOLS STREAMING ADJACENT AN ACTIVE REEL MATRIX WITH REEL EXPANSION AND SYMBOL ABSORPTION PROCESSES

(71) Applicant: Aristocrat Technologies, Inc., Las Vegas, NV (US)

(72) Inventors: Eric Boese, Decatur, GA (US); Ronald Williams, II, Atlanta, GA (US); Jae Yi, Alpharetta, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 734 days.

(21) Appl. No.: 17/957,129

(22) Filed: Sep. 30, 2022

(65) Prior Publication Data
US 2023/0104938 A1 Apr. 6, 2023

Related U.S. Application Data

(60) Provisional application No. 63/252,369, filed on Oct. 5, 2021.

(51) Int. Cl.
*G07F 17/34* (2006.01)
*G06F 7/58* (2006.01)
*G07F 17/32* (2006.01)

(52) U.S. Cl.
CPC .......... *G07F 17/3267* (2013.01); *G06F 7/588* (2013.01); *G07F 17/3213* (2013.01); *G07F 17/3244* (2013.01)

(58) Field of Classification Search
CPC ............. G07F 17/3267; G07F 17/3213; G07F 17/3244; G06F 7/582; G06F 7/588
See application file for complete search history.

(56) References Cited

U.S. PATENT DOCUMENTS

| | | |
|---|---|---|
| 8,795,059 B2 | 8/2014 | Aoki |
| D724,614 S | 3/2015 | Mullet |
| D727,960 S | 4/2015 | Chaudhri |
| D744,528 S | 12/2015 | Agrawal |
| D755,216 S | 5/2016 | Lee |

(Continued)

OTHER PUBLICATIONS

Office Action dated Mar. 14, 2025 for U.S. Appl. No. 29/810,478 (pp. 1-11).

(Continued)

*Primary Examiner* — David L Lewis
*Assistant Examiner* — Shauna-Kay N. Hall
(74) *Attorney, Agent, or Firm* — Weaver Austin Villeneuve & Sampson LLP

(57) ABSTRACT

An electronic gaming device that satisfies a return-to-player value when different features are initiated. The electronic gaming device includes a display device and a controller. The controller animates in the active reel matrix a plurality of game symbols, and a plurality of configurable symbols selected moving from a space moving into the active reel matrix. When the plurality of game symbols selected include a first trigger symbol, the controller also expands the active reel matrix to include more symbols. When the active reel matrix includes a second trigger symbol, the controller absorbs values of the plurality of configurable symbols into the second trigger symbol.

20 Claims, 16 Drawing Sheets

(56) References Cited

U.S. PATENT DOCUMENTS

| | | | |
|---|---|---|---|
| D755,819 | S | 5/2016 | Gao |
| D757,081 | S | 5/2016 | Govindan Sankar Selvan |
| D767,608 | S | 9/2016 | Evans |
| D783,030 | S | 4/2017 | Lee |
| D793,409 | S | 8/2017 | Berman |
| D797,127 | S | 9/2017 | Chaudhri |
| D808,977 | S | 1/2018 | Zhao |
| D819,060 | S | 5/2018 | Friedman |
| D820,294 | S | 6/2018 | Lee |
| D823,862 | S | 7/2018 | Chung |
| D830,375 | S | 10/2018 | Phillips |
| 10,120,529 | B2 | 11/2018 | Felt |
| D838,739 | S | 1/2019 | Coffman |
| D839,305 | S | 1/2019 | Hawkins |
| D839,884 | S | 2/2019 | Mussinov |
| D839,899 | S | 2/2019 | Suslik |
| D842,327 | S | 3/2019 | Suslik |
| D850,464 | S | 6/2019 | Satterlie |
| D856,345 | S | 8/2019 | Clifford |
| D858,557 | S | 9/2019 | Penacho |
| D875,116 | S | 2/2020 | Bae |
| D875,121 | S | 2/2020 | Ji |
| D892,142 | S | 8/2020 | Clifford |
| D900,127 | S | 10/2020 | Visser |
| D900,130 | S | 10/2020 | Matos |
| D900,833 | S | 11/2020 | Alonso Ruiz |
| D900,846 | S | 11/2020 | Baker |
| D904,448 | S | 12/2020 | Coffman |
| 10,930,119 | B2 | 2/2021 | Moskowitz |
| D918,243 | S | 5/2021 | Suslik |
| D928,816 | S | 8/2021 | Agarwal |
| 2009/0124385 | A1 | 5/2009 | Cuddy |
| 2010/0124969 | A1 | 5/2010 | Hughes |
| 2010/0261524 | A1 | 10/2010 | Pawloski |
| 2012/0172106 | A1 | 7/2012 | Caputo |
| 2013/0217469 | A1 | 8/2013 | Fujisawa |
| 2013/0231174 | A1 | 9/2013 | Fujisawa |
| 2013/0281207 | A1 | 10/2013 | Lyons |
| 2013/0321340 | A1 | 12/2013 | Seo |
| 2014/0248938 | A1 | 9/2014 | Tidke |
| 2015/0018070 | A1 | 1/2015 | Meyer |
| 2015/0080085 | A1 | 3/2015 | Pawloski |
| 2015/0170477 | A1 | 6/2015 | Souza |
| 2015/0254932 | A1 | 9/2015 | Boese |
| 2015/0325079 | A1 | 11/2015 | Alsip |
| 2015/0379831 | A1 | 12/2015 | Lee |
| 2016/0018978 | A1 | 1/2016 | Zenoff |
| 2016/0085431 | A1 | 3/2016 | Kim |
| 2016/0093147 | A1 | 3/2016 | Penacho |
| 2016/0133095 | A1 | 5/2016 | Shraibman |
| 2016/0328926 | A1 | 11/2016 | Boese |
| 2017/0024955 | A1 | 1/2017 | Pawloski |
| 2017/0024957 | A1 | 1/2017 | Boese |
| 2017/0165573 | A1 | 6/2017 | Froy |
| 2017/0301177 | A1 | 10/2017 | Pawloski |
| 2018/0061176 | A1 | 3/2018 | Berman |
| 2018/0364665 | A1 | 12/2018 | Clymer |
| 2019/0073858 | A1 | 3/2019 | Penacho |
| 2019/0213838 | A1 | 7/2019 | Hemovich |
| 2019/0224574 | A1 | 7/2019 | Lehwalder |
| 2020/0312087 | A1* | 10/2020 | Kendall .................. G06F 7/588 |
| 2021/0056810 | A1* | 2/2021 | La Guardia ......... G07F 17/3265 |
| 2021/0279999 | A1* | 9/2021 | Meyer ................. G07F 17/3267 |

OTHER PUBLICATIONS

"Memorize The Guitar FFretboard In 5 Minutes" Apr. 2, 2021, YouTube, site visited Feb. 15, 2025: https://www.youtube.com/watch?v=ppM7UaSJ_JQ( (Year: 2021).

* cited by examiner

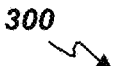

PLAYER INPUT(S)

302

UI SYSTEM

304

GAME PLAY UI

306A

GAME PLAY UI ELEMENT

●●●

306N

GAME PLAY UI ELEMENT

308

BONUS GAME PLAY UI

310A

BONUS GAME PLAY UI ELEMENT

●●●

310N

BONUS GAME PLAY UI ELEMENT

312

MULTIPLAYER UI

RNG CALLS     RNG CALLS     RNG CALLS

314

GAME PROCESSING BACKEND SYSTEM

316

RNG ENGINE

318

GAMING RNG

319A

NON-GAMING RNG

●●●

319N

NON-GAMING RNG

RNG OUTCOMES

320

RNG CONVERSION ENGINE

322A

LOOKUP TABLE

322B

LOOKUP TABLE

●●●

322N

LOOKUP TABLE

UI OUTCOMES

ELECTRONIC GAMING MACHINE WITH SYMBOLS STREAMING ADJACENT AN ACTIVE REEL MATRIX WITH REEL EXPANSION AND SYMBOL ABSORPTION PROCESSES

RELATED APPLICATION

The present application claims priority to U.S. Provisional Patent Application No. 63/252,369, filed Oct. 5, 2021, and entitled "Electronic Gaming Machine Display for Symbols in Reels Adjacent an Active Reel Matrix with Reel Expansion and Symbol Absorption Processes," which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Described herein is a system, method, and non-transitory computer-readable medium for conducting a game on an electronic gaming system. The electronic gaming system may include a display operable to display a matrix of display positions, and a gaming controller that may include a processor and a memory storing one or more sequences of instructions. When one or more sequences of instructions are executed, the processor randomly selects a plurality of symbols for display at the matrix of display positions based on a random number generator, and when the matrix of display positions displays a trigger symbol, animates a movement of at least one of the symbols displayed above the matrix into the matrix, animates a different movement of values displayed on the symbols from the symbols to be absorbed by the trigger symbol.

A gaming system is described that comprises at least one display, a game controller that includes at least one processor and at least one memory device. The at least one processor, the at least one memory device, and the at least one display are operably connected. The at least one memory device stores computer-readable instructions for controlling the at least one processor to select and display a plurality of symbols in a respective plurality of display positions on a display for each implemented game, when a trigger symbol appears, highlight one or more symbols outside of the plurality of display positions and the plurality of symbols displayed in the plurality of display positions, generate an animation movement of value displayed on the one or more symbols outside of the plurality of display positions and on the plurality of symbols displayed in the plurality of display positions to be absorbed by the trigger symbol, and award a win amount based on the value absorbed by the trigger symbol.

For example, one embodiment of the disclosure provides an electronic gaming device that includes a display device having a space adjacent to an active reel matrix, and a controller that further includes a processor and memory. The memory stores a set of game symbols including a plurality of trigger symbols, and a set of configurable symbols having a plurality of values, respectively, and instructions. When executed, the instructions cause the processor to at least: control the display device to display in the active reel matrix, animate in the active reel matrix a plurality of game symbols selected from the set of game symbols based on one or more random numbers generated by a random number generator, animate in the space a plurality of configurable symbols selected from the set of configurable symbols, in an inactive state, moving from the space into at least a portion of the active reel matrix, the plurality of configurable symbols replacing some or all of the plurality of game symbols in the portion of the active reel matrix with the plurality of configurable symbols, control the display device to expand the portion of the active reel matrix, when the plurality of game symbols selected include a first trigger symbol, to include one or more additional symbols in the active reel matrix, activate the plurality of configurable symbols in the active reel matrix, and communicate an award evaluated based on the plurality of game symbols and the plurality of configurable symbols in the active reel matrix.

BRIEF DESCRIPTION OF THE DRAWINGS

For the purpose of illustration, certain embodiments are shown in the drawings. It should be understood, however, that embodiments of the present invention is not limited to the arrangements and instrumentality shown in the attached drawings. In the drawings, various dimensions may be exaggerated for illustrative clarity. Additionally, like reference numbers are utilized to refer to like elements throughout the present disclosure. The features and utilities described in the foregoing brief summary, as well as the following detailed description of certain embodiments, will be better understood when read in conjunction with the accompanying drawings of which:

FIG. 3 illustrates, in block diagram form, an implementation of a game processing architecture algorithm that implements a game processing pipeline for the play of a game in accordance with various implementations described herein.

DETAILED DESCRIPTION

Figure 1:
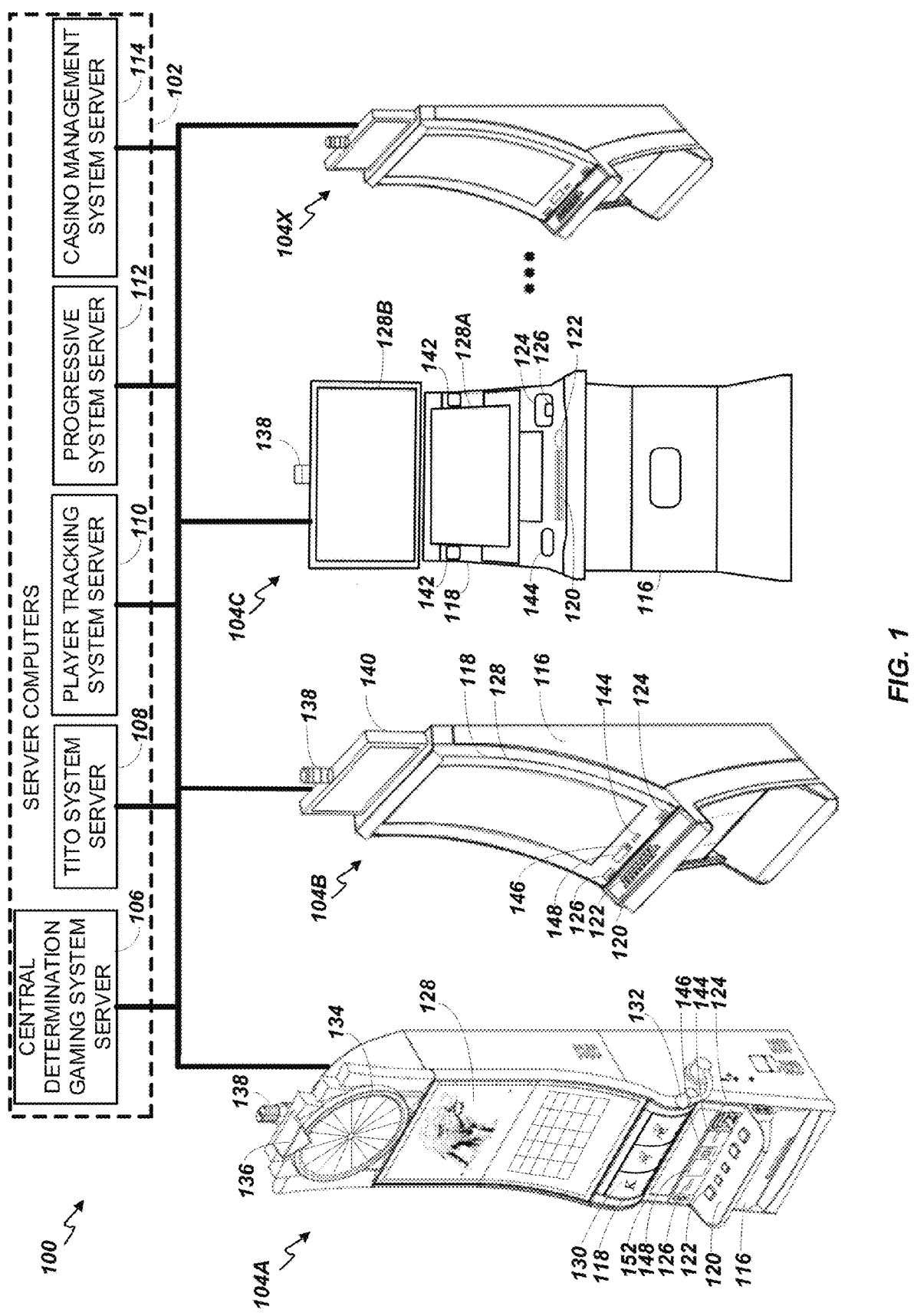
FIG. 1 is an exemplary diagram showing several EGMs networked with various gaming related servers.

There is disclosed a gaming device, a method of operating a gaming device and a system that employ a graphical display having a stream space with stream symbols streaming into an adjacent active reel matrix to provide a visual transformation of game symbols in the active reel matrix and other characteristics in a dimensionally confined physical display space. In example embodiments, when the active reel matrix displays a trigger symbol, the gaming device animates a movement of the stream symbols displayed adjacent the active reel matrix into the active reel matrix while sequentially activating the stream symbols, or transitioning the stream symbols that are in an OFF state in the stream space into an ON state when the stream symbols land in the active reel matrix, and an absorption of some values displayed in the active reel matrix by the trigger symbol while deactivating the stream symbols in the stream space that have been absorbed, or transitioning the ON state of the stream symbols in the stream space that been absorbed into an OFF state.

In some embodiments, a graphical display is located adjacent an active reel matrix, e.g., above the active reel matrix. During operation, a plurality of symbols at a plurality of symbol positions may be randomly selected for animated display in the graphical display above the active reel matrix, and, in turn, may be processed by the processor to spin in a reel or in other spatial configuration, to be included in an expanded active reel matrix or for eligibility in an outcome evaluation, among other things.

For example, when one or more of the symbols selected include one or more trigger symbols, the gaming machine processor triggers animation mechanics that animates symbols or symbol values displayed as moving from one or more initial symbol display positions outside of the active reel matrix into the active reel matrix. Including the symbols outside of the active matrix in a reel spinning through the active reel matrix expands the apparent reel size to the player and enhances the visual cues to the players about which symbols may be added to the active reel matrix, which simplifies reel presentation to the player. Additionally, the graphical display adjacent the active reel matrix enables symbols outside and inside the active reel matrices to be combined or separated to further enhance outcomes while maintaining a simple display in a dimensionally confined electronic display and without overly increasing the processor or memory functionality requirements.

By way of a further example, the processor initiates and controls animation mechanics that may include a symbol value absorption process. In the absorption process, the processor controls the display to present the values on the symbols in symbol positions inside and/or outside of the active reel matrix. Upon the occurrence of a trigger condition, such as a trigger symbol in a pre-determined reel or symbol position, the processor animates the values or the symbols with values to be absorbed into and increase the total value of the one or more trigger symbols in the active reel matrix. Further, the visual absorption of the values technically improves the usability of the electronic game machine display such that the player may only need to focus on a single special symbol being displayed and visually changed to absorb the symbol values from inside and outside of the active reel matrix. This minimizes or eliminates the player from being overly burdened by complicated rule screens or otherwise for outcome determination, including return calculations, thus improving capability and usability of the dimensionally-confined display space.

By way of a further example, the active reel matrix may also be configured to include a visual reel expansion of the active reel matrix. When triggered, the processor causes a reel expansion that expands the size of the initial active reel matrix to include one or more symbols or symbol positions in the graphical display adjacent the initial active reel matrix. This expansion enables an increase of possible outcomes due, in part, to the availability of one or more symbols or symbol positions in a graphical display above an active reel matrix for inclusion in the active reel matrix. Employing additional symbols or symbol positions from the graphical displace adjacent the active reel matrix expands the possible game outcomes and in turn, optimizes the finite space available to improve or enhance the display reels and symbols in the display, while still maintaining regulatory requirements. These are not trivial technical challenges in the gaming industry.

As such, embodiments of the present disclosure are not merely new game rules or simply new display patterns, but provide technologic improvements to a graphical display in the art of electronic gaming machines and software for such electronic gaming machines. Moreover, the above examples are not intended to be limiting, but merely exemplary of technologic improvements provided by some embodiments of the present disclosure. Technological improvements of other embodiments to the functionality, capability and/or usability of an electronic gaming machine or components thereof should be readily apparent to those of ordinary skill in the art in light of the present disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
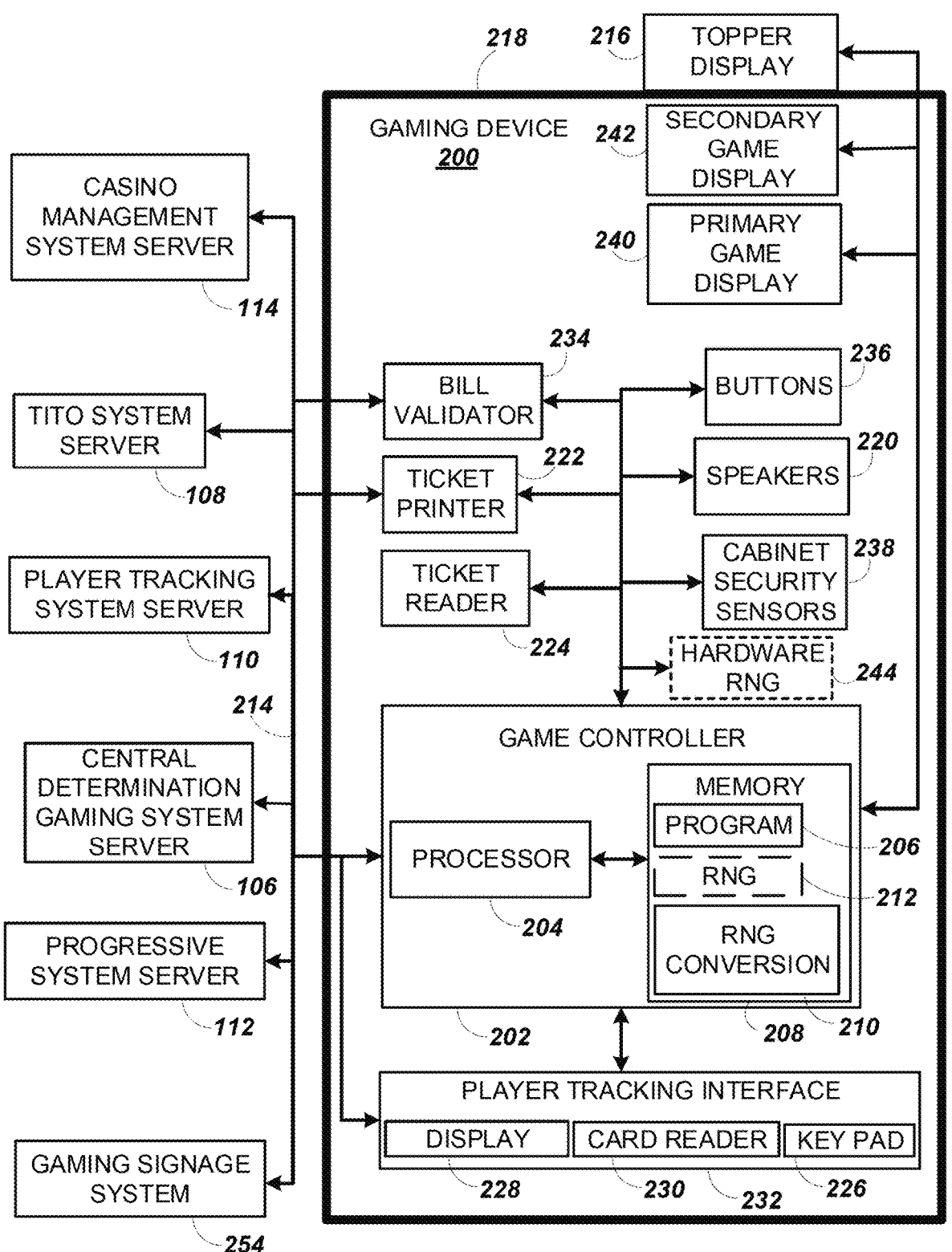
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218.

Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
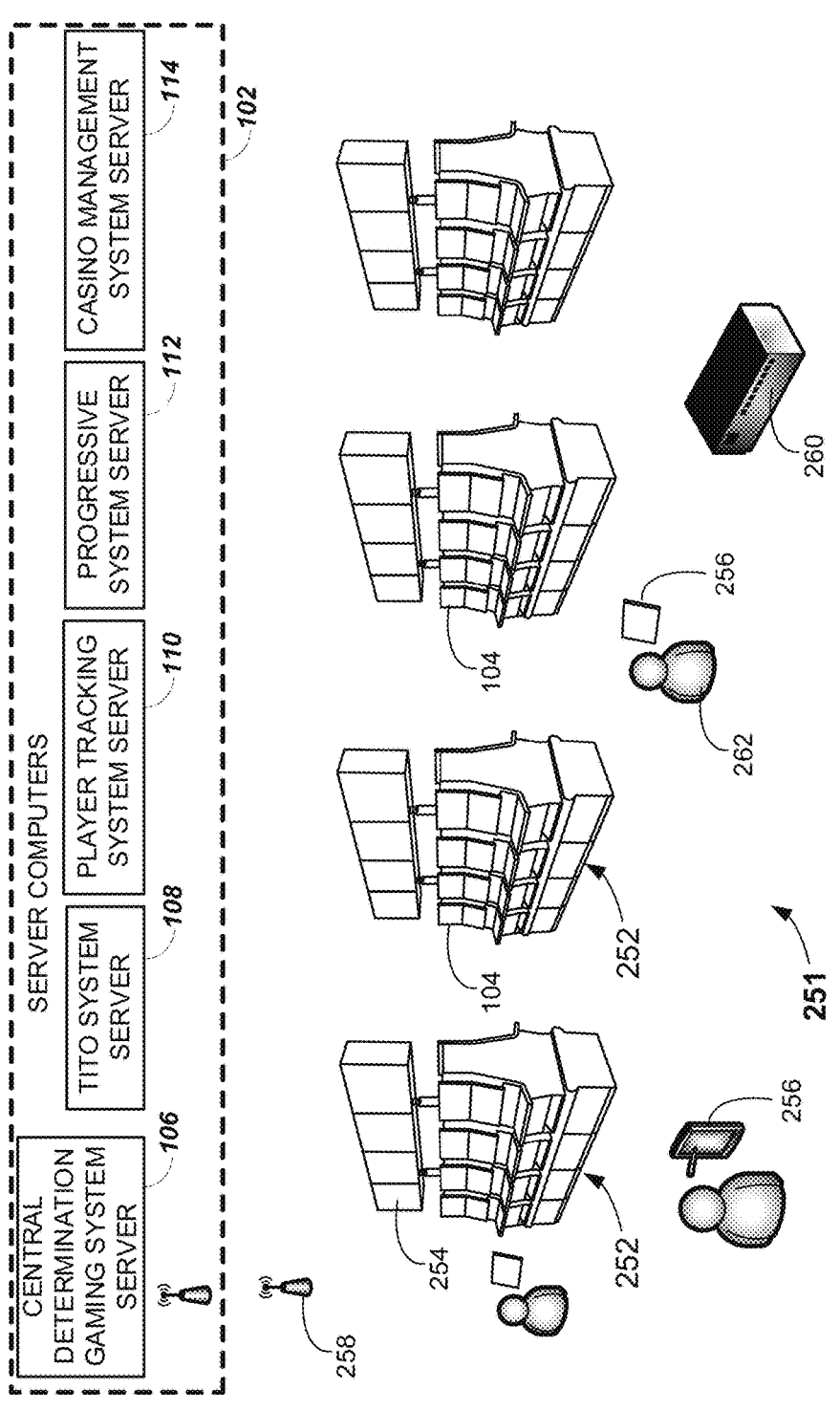
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
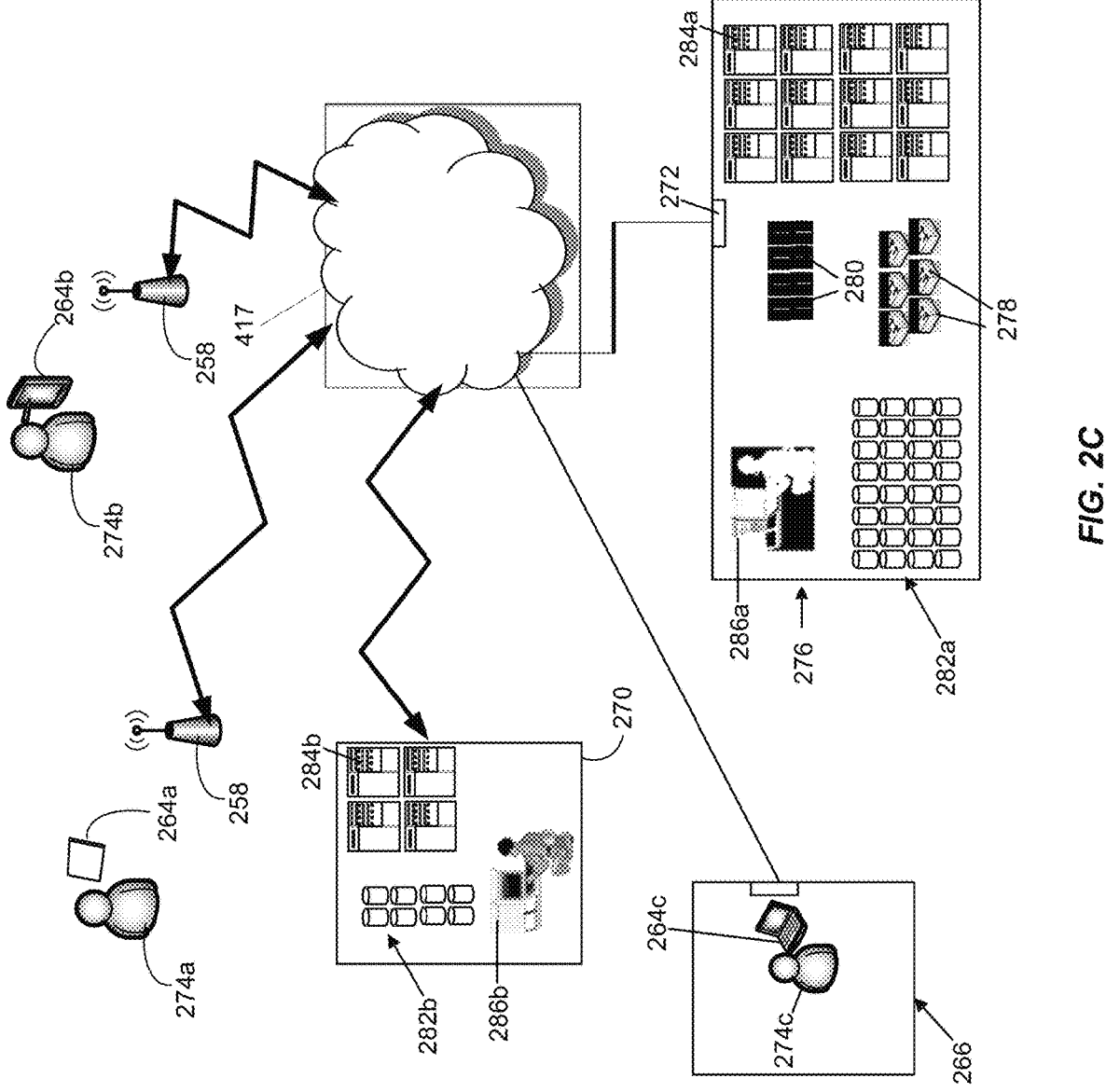
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server (s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables or pay tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
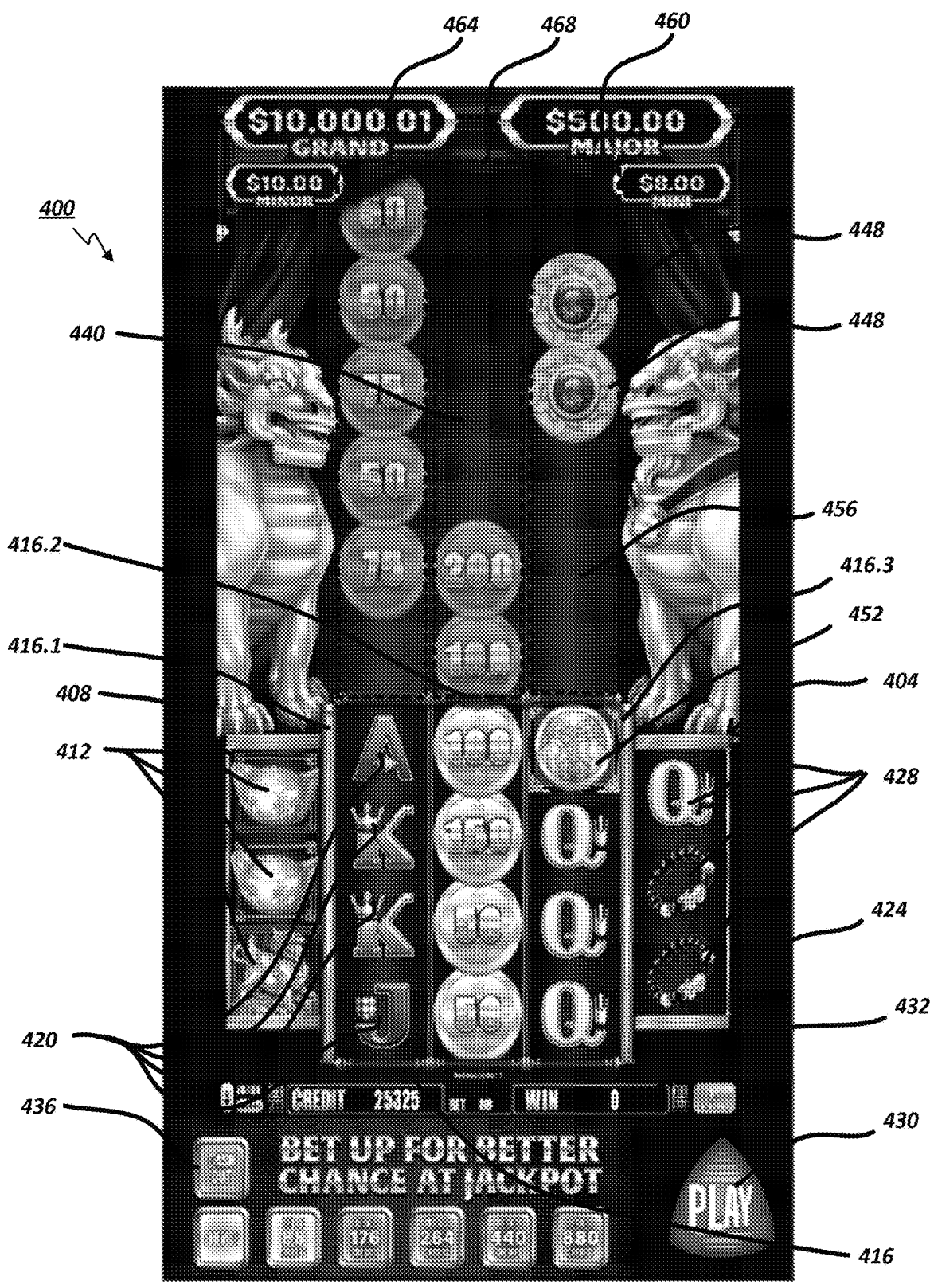
FIG. 4 illustrates a matrix of symbols being displayed on a display device.

In an exemplary feature game 400 according to an embodiment as shown in FIG. 4, an active reel matrix 404 of symbols that may be evaluated for one or more winning combinations. An exemplary feature game 400 may be triggered based on symbols shown in the active reel matrix 404 or a base game (not shown). Different symbols may appear in the active reel matrix 404. For example, in some embodiments, a wild symbol may appear and substitute any other symbols except for feature trigger symbols, cash on reel (COR) symbols, and bonus symbols. In other embodiments, however, the wild symbol may substitute or replace all other symbols. The active reel matrix 404 is shown with a 34443-format, including a first reel 408 having three display positions 412, three central reels 416 each having four display positions 420, and a fifth reel 424 having three display positions 428. Specifically, the three central reels 416 includes a left central reel 416.1, a middle central reel 416.2, and a right central reel 416.3. However, the active reel matrix 404 may take on any other number of reels and display positions per reel. For example, the active reel matrix 404 may be 45554-format matrix, including five reels having three central reels with each having five symbol display positions, and a first and a fifth reel with four symbol display positions. In yet other embodiments, the active reel matrix 404 may be 3×5 matrix, including five reels each having three display positions.

In the exemplary feature game 400, feature trigger symbols may only appear or be displayed on one or both of the first reel 408 and the fifth reel 424, while cash on reel (COR) symbols and bonus symbols may only appear or be displayed on any of the left central reel 416.1, the middle central reel 416.2, and the right central reel 416.3. In other embodiments, however, the feature trigger symbols, cash on reel (COR) symbols and bonus symbols may appear in any of display positions in the active reel matrix 404. By way of example, the feature trigger symbols may appear on one or both of the first reel 408 and second reel 416.1 and the COR symbols and bonus symbols (and reel expansions may occur, discussed below) may appear only on the third through fifth reels, 416.2, 416.3 and 424.

When a player deposits money or tickets, or transfer credits to increase a credit count on the credit meter, a gaming machine (such as the gaming machines 104A, 104B, 104C, or the 104X) may initiate an introductory audio sequence, for example, to prompt the player to select bet sizes, or to initiate the base game. In some cases, when the player selects a "PLAY" button 430, the gaming machine may initiate the base game at the bet size last used, without the player having to select any bet sizes. In either case, the credit amount count on the credit meter may decrease by the bet size and base game reels spin, and reels in the active reel matrix 404 (the first reel 408, the left central reel 416.1, the middle central reel 416.2, the right central reel 416.3, and the fifth reel 424) may begin to spin for a predetermined amount of time, for example, 2.6 seconds, either simultaneously, concurrently, synchronously, or asynchronously. The reels may spin in same directions, in different directions, synchronously, asynchronously, at the same speeds, or different speeds. The reels may come to a stop similarly, that is, synchronously or asynchronously, at the same speeds, or different speeds. For example, in some embodiments, the reels may stop spinning from left to right during normal play. In other embodiments, the player may force all reels to stop at once by pressing the "PLAY" button 430 or one of the bet buttons. If there are no wins, the game ends. If there are one or more reel power wins, a total of the reel power wins will show in a "WIN" meter 432 and the credit amount will increase by a corresponding amount.

If one or more free games are activated as a feature game, the base game pays are calculated and added to the "WIN" meter prior to initiating any feature games. In some embodiments, an award bell may sound after a last reel of triggering spin lands, prior to the base game pays being awarded. After the plurality of free games are complete, all wins from the initial spin and the bonus round are added together and shown in the "WIN" meter. The credit meter will be increased by a corresponding amount. Games are repeated until the player pushes a "CASH OUT" button 436, or runs out of credits necessary to place a minimum bet, which may effectively terminates the gaming session. In some embodiments, upon the "CASH OUT" button 436 having been selected, the gaming machine may play an exit audio, or may print one or more "CASH OUT" tickets and reset CREDIT meter to zero, and the gaming machine returns to an "ATTRACT" sequence.

In some embodiments, the processor 204 controls the display to display anticipation animation plays during the base game over the active reel matrix 404 a predetermined percentage of time, e.g., 40%, when a big win or a plurality of free games are triggered on a spin. For example, the reels begin to stop a predetermined amount of time, e.g., one second, after the animation has cleared. In some embodiments, slamming or force stop is disabled until animation has completed, while displaying a winning message, such as, for example, "LUCK HAS ARRIVED!", and continuing an audio track until the last reel lands or stops.

FIG. 4 also shows a stream space 440 where additional symbols may appear or be displayed adjacent to the active reel matrix 404, which may be above, below or to the side of the active reel matrix 404. The stream space 440 may take the form of a structured reel matrix like that shown in FIG. 4. Other less structured forms are possible. The additional symbols shown in the stream space 440 may be arranged in a reel that may form a single reel with the reels in the active reel matrix 404, or separate reels from the reels in the active reel matrix 404. The stream space 440 may also be appear adjacent one reel, some reels, or all of reels in the active reel matrix 404. The stream space 440 may also be uniform across the active reel matrix 404, or different for different portions of the active reel matrix 404. For example, the stream space 440 for one reel may be different from another reel at any given time during game operations.

For example, each stream space 440 may be partially aligned with at least one of the three central reels 416 of the active reel matrix 404 such that the stream space 440 and the at least one of the three central reels 416 may appear to be vertically continuous reels as shown in FIG. 4. Each stream space 440, however, need not be wholly vertically aligned with any one of the three central reels 416, and stream space 440 may have different configurations that vary over time or game play, or satisfy specific jurisdiction requirements, volatility, or return-to-player, e.g., evolving from a wholly random arrangement to a vertically-aligned arrangement similar to that shown in FIG. 4, for example, depending on conditions during game operations. In other embodiments, the inactive symbols may be displayed on a rotating cylinder of symbols that rotate and are selected for the active reel matrix 404, where the selected symbols could vertically align with the active reels 416. In still some other embodiments, the inactive symbols may be animated to float above the active reel matrix 404 until selected and then activated in the active reel matrix 404.

In some embodiments, the stream space 440 may determine a quantity of additional symbols that may be displayed. In some embodiments, dimensions of displays (e.g., the display 128 in FIG. 1), the size of the display positions or the type or configuration (e.g., an EGM with rotating screens) of gaming machine may also determine the dimensions of the stream space 440. In the embodiment shown, the stream space 440 may allow six complete additional symbols to appear above each reel of the central reels 416. In other embodiments, the stream space 440 may allow more or less complete additional symbols to appear.

By way of example, some or all of the complete additional symbols may appear in different, the same or varying sizes than those appear in the active reel matrix 404. In such cases, as the complete additional symbols approach or stream down into the active reel matrix 404, the complete additional symbols with different or varying sizes may be transformed or reconfigured to conform to the dimensions of the symbols in the active reel matrix 404. Additionally, the size and position of the stream space 440 and/or the active reel matrix 404 may change or be reconfigure to accommodate viewing if the EGM display is rotated or repositioned, which may reduce or increase the size or cause the repositioning of the stream space 440 or the active reel matrix 404.

In some embodiments, each of the complete additional symbols that appear in the stream space 440 may form a part of each of the central reels 416. For example, red coin symbols 448 may be a part of the right central reel 416.3, and may be separated from lion symbol 452 by three blank positions 456. In other embodiments, however, each of the complete additional symbols that appears in the stream space 440 may be symbols on a plurality of reels separate or different from the reels (the first reel 408, the left central reel 416.1, the middle central reel 416.2, the right central reel 416.3, and the fifth reel 424) in the active reel matrix 404. For example, the red coin symbols 448 may belong to an optional sixth reel. By way of further example, employing separate reels for the symbols positioned in the stream space 440 allows for other graphical variations and animations, such as overlaying or floating the symbols positioned in the stream space to replace the active symbols in the active reel matrix 404. Such a configuration may be employed to make greater use of the display area while enhancing feature operation.

FIG. 4 also illustrates symbol stacks 460, 464, 468 streaming in the stream space 440 into the active reel matrix 404. Symbol stacks 460 may comprise a zero symbol stack such that no symbols appear in the stream space 400, or may comprise a predetermined symbols stack such that one or more symbols appear in the stream space 440 are displayed in a stacked or otherwise aligned configuration, as shown, for example, in FIG. 4.

In the embodiment shown in FIG. 4, symbol stacks appear or become visible adjacent or above the central reels 416 of the active reel matrix 404, and spin down though the active reel matrix 404. Specifically, as shown, the symbol stacks 460, 464, 468 stream down from the stream space 440 first into the left central reel 416.1, then into the middle central reel 416.2, and then into the right central reel 416.3, respectively. Other sequences are contemplated, e.g., sequenced in reverse (a right to left), from the side or bottom of the active reel matrix 404, simultaneously or in other predetermined sequences, including random sequences.

In the embodiment shown, the symbol stacks 460, 464, 468 are only partially visible when not in the active reel matrix 404. In some embodiments, when the symbols are partially visible, the symbols may be considered in an inactive state or appear to the player as dimmed relative to the symbols when in an active state in the active reel matrix 404. The symbols may appear dimmed until the processor (like the processor 204 of FIG. 2A) activates the partially visible symbols for the feature operation. Such symbols may be in such an inactive state until they form part of the active reel matrix 404, which may be in the form of an expanded active reel matrix 404, as discussed further below.

Additionally, each of the three central reels 416 may comprise a single reel with a set of symbols, e.g., cash-on-reel (COR) symbols, for both the inactive and active symbols. The single reel may be dynamically controlled to activate and inactivate symbols depending on whether they are present in the active reel matrix 404 or not. In some embodiments, the COR symbols are displayed in one of a plurality of operational states. For example, a COR symbol that has been activated may be in an "ON" state, the COR symbol may be considered as ON symbol, while a COR symbol that has been deactivated, inactivated, or dimmed may be in an "OFF" state, the COR symbol may be considered as OFF symbol. In other embodiments, each of the three central reels 416 may comprise more than one reel. For example, two reels may be employed for each of the three central reels 416, where one of the two reels provides the COR symbols for the active reel matrix 404 that are displayed in the stream space 440 and another of the two reels provides the game symbols for the active reel matrix 404. Employing more than one reel in this way allows for an overlay, replacement, or masking of the active reels 416 in the active reel matrix 404 with the additional reels. This overlay, replacement, or masking of separate reels also may allow for independent control and selection of the reel strips, e.g., to meet a game design, game control, jurisdictional requirement, volatility, or return-to-player. However, when transitioning the COR symbols from an OFF state or being inactive, that is the OFF symbols, in the stream space 440 to an ON state or being activated when entering the active reel matrix 404 becoming the ON symbols, or from an ON state or being activated while in the stream space 440 to an OFF state or being deactivated when values of the COR symbols are being absorbed, the COR symbols may be dynamically activated or deactivated in a timed sequence or consecutively in a sequence. In such embodiments, dynamically activating or deactivating the COR symbols may be technically coordinated or synchronized with any appropriate animations and awards on the display to improve visibility and award awareness for a player, based on game design, while being able to satisfy security requirements, specific jurisdiction requirements, volatility, or return-to-player in a gaming environment, and even certain hardware and software architectures. Further, this overlaying, replacement, or masking arrangement may allow each reel to have varying degrees of transparency, and may also eliminate or minimize on/off blinking or flashing between the inactive and active symbols during game operations. The overlaying, replacement, or masking arrangement may in some embodiments maintain the kind of dynamic change of the inactive symbols to active symbols, when the inactive symbols become active symbols in the active reel matrix 404 and still keep the potential benefits of controlling independent reels.

Figure 5:
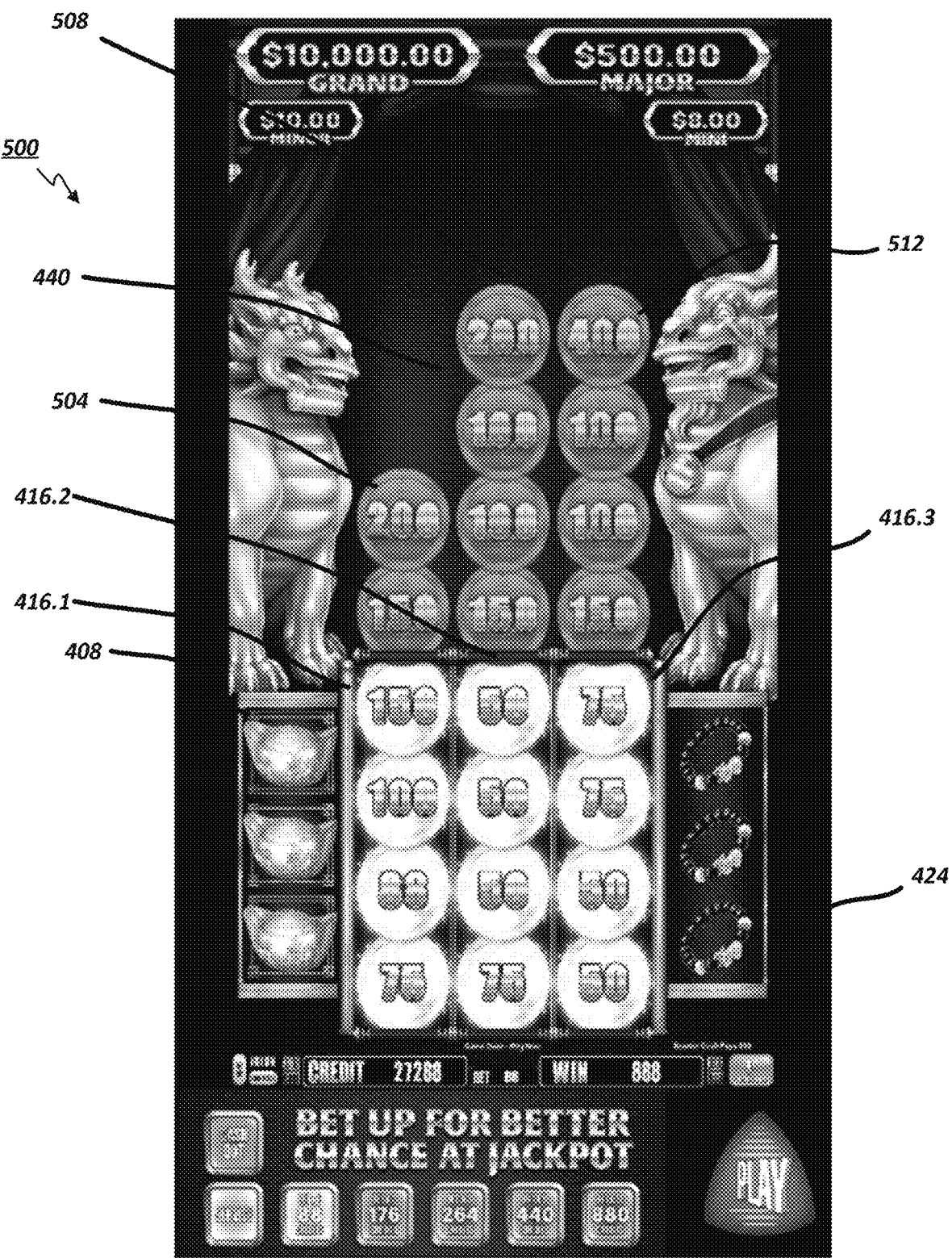
FIG. 5 illustrates a screenshot of symbol stacks with COR symbols being streamed from a stream space into matrix.

FIG. 5 illustrates a screenshot 500 of symbol stacks 504, 508, 512 with COR symbols having streamed from the stream space 440 into the active reel matrix 404. When the symbol stacks 504, 508, 512 pass from the stream space 440 into the active reel matrix 404, the COR symbols become fully visible or in an active state, or are activated to become fully visible or in an active state, and replace any regular symbols in the same position as the COR symbols spins through each of the central reels 416 into the active reel matrix 404.

In some embodiments, every COR symbol may be newly populated with a value or a jackpot from respective math tables before each reel spin. In some embodiments, COR symbols are won in a three-reel scatter style, that is, at least one COR symbol landing in the left central reel 416.1, the middle central reel 416.2, and the right central reel 416.3, in the active reel matrix 404 win all cash values on the COR symbol in a scatter win. In the embodiment shown in FIG. 5, there is at least one COR symbol landing in each of the left central reel 416.1, the middle central reel 416.2, and the right central reel 416.3, in the active reel matrix 404. As a result, all COR values in the active reel matrix 404 are awarded in the "WIN" meter 432. As shown, the "WIN" meter 432 shows a value of 888 credits resulting from summing all the COR values in the active reel matrix 404, from top to bottom, left to right, 150, 100, 88, 75, 50, 50, 50, 75, 75, 75, 50, and 50. In some embodiments, the outcome may be enhanced due to other triggering conditions. In this regard, since only the middle central reel 416.2 in FIG. 4 displays COR symbols, no win is attributed to the COR symbols in the middle central reel 416.2.

Figure 6:
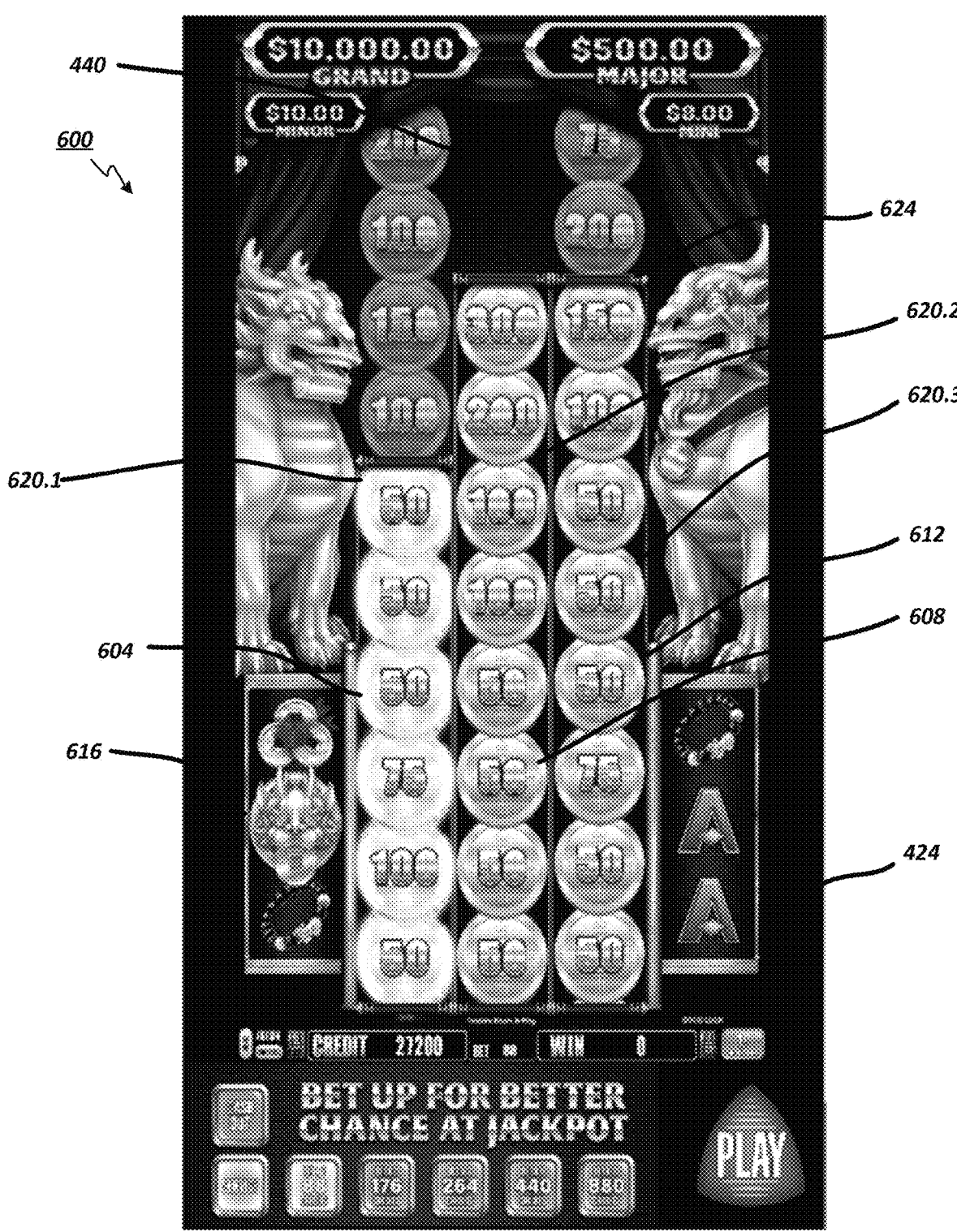
FIG. 6 illustrates a screenshot of symbol stacks with COR symbols being streamed from a stream space into an expanding matrix.

FIG. 6 is a screenshot 600 illustrating symbol stacks 604, 608, 612 with COR symbols having streamed from the stream space 440 into the active reel matrix 404. The processor (like the processor 204 of FIG. 2A) initiates, in response to a first trigger symbol 616 appearing or landing on the first reel 408, the left central reel 416.1, the middle central reel 416.2, and the right central reel 416.3 of the active reel matrix 404, an expansion process that causes the active reel matrix 404 to be expanded in real-time based on math tables while the reels are still spinning. This expansion expands the symbol positions in the reels of the active reel matrix 404 that are evaluated by the processor (like the processor 204 of FIG. 2A) during operation.

More specifically, in the expansion process, the processor 204 controls the display to expand the left central reel 416.1, the middle central reel 416.2, and the right central reel 416.3 of the active reel matrix 404 to an expanded left central reel 620.1, an expanded middle central reel 620.2, and an expanded right central reel 620.3, respectively. As shown, the left central reel 416.1, which has four display positions and expands so that the expanded left central reel 620.1 includes six display positions in the active reel matrix 404. Similarly, both the middle central reel 416.2 and the right central reel 416.3 are each expanded to include eight display positions per reel, respectively. The expanded central reels 620.1, 620.2 and 620.3 form an expanded active reel matrix 624.

In some embodiments, during the expansion process, the processor (like the processor 204 of FIG. 2A) randomly assigns an order in which the left central reel 416.1, the middle central reel 416.2, and/or the right central reel 416.3 of the active reel matrix 404 are to expand. In other embodiments, the processor (like the processor 204 of FIG. 2A) predetermines the order in which the left central reel 416.1, the middle central reel 416.2, and/or the right central reel 416.3 of the active reel matrix 404 are to expand. A predetermined amount of time may be predetermined to lapse or a predetermined value accumulated during operation before expanding the left central reel 416.1, the middle central reel 416.2, and the right central reel 416.3.

Furthermore, in some embodiments, during the expansion process, the processor (like the processor 204 of FIG. 2A) may also randomly determine a quantity of additional display positions for each of the left central reel 416.1, the middle central reel 416.2, and the right central reel 416.3 of the active reel matrix 404. In other embodiments, however, the processor (like the processor 204 of FIG. 2A) may also predetermine a quantity of additional display positions for each of the left central reel 416.1, the middle central reel 416.2, and the right central reel 416.3 of the active reel matrix 404 based on math tables while the central reels are still spinning. In still other embodiments, the processor 204 may expand the left central reel 416.1, the middle central reel 416.2, and the right central reel 416.3 by equal quantities, concurrently.

When the processor (like the processor 204 of FIG. 2A) terminates the expansion process, and the left central reel 416.1, the middle central reel 416.2, the right central reel 416.3, and the fifth reel 424 have stopped spinning, a processor (like the processor 204 of FIG. 2A) evaluates any COR symbols displayed for an award. In this regard, the left central reel 416.1, the middle central reel 416.2, and the right central reel 416.3, and the fifth reel 424 may all come to stop concurrently or asynchronously. After evaluations of the symbols displayed, the "WIN" meter 432 is updated.

Figure 7:
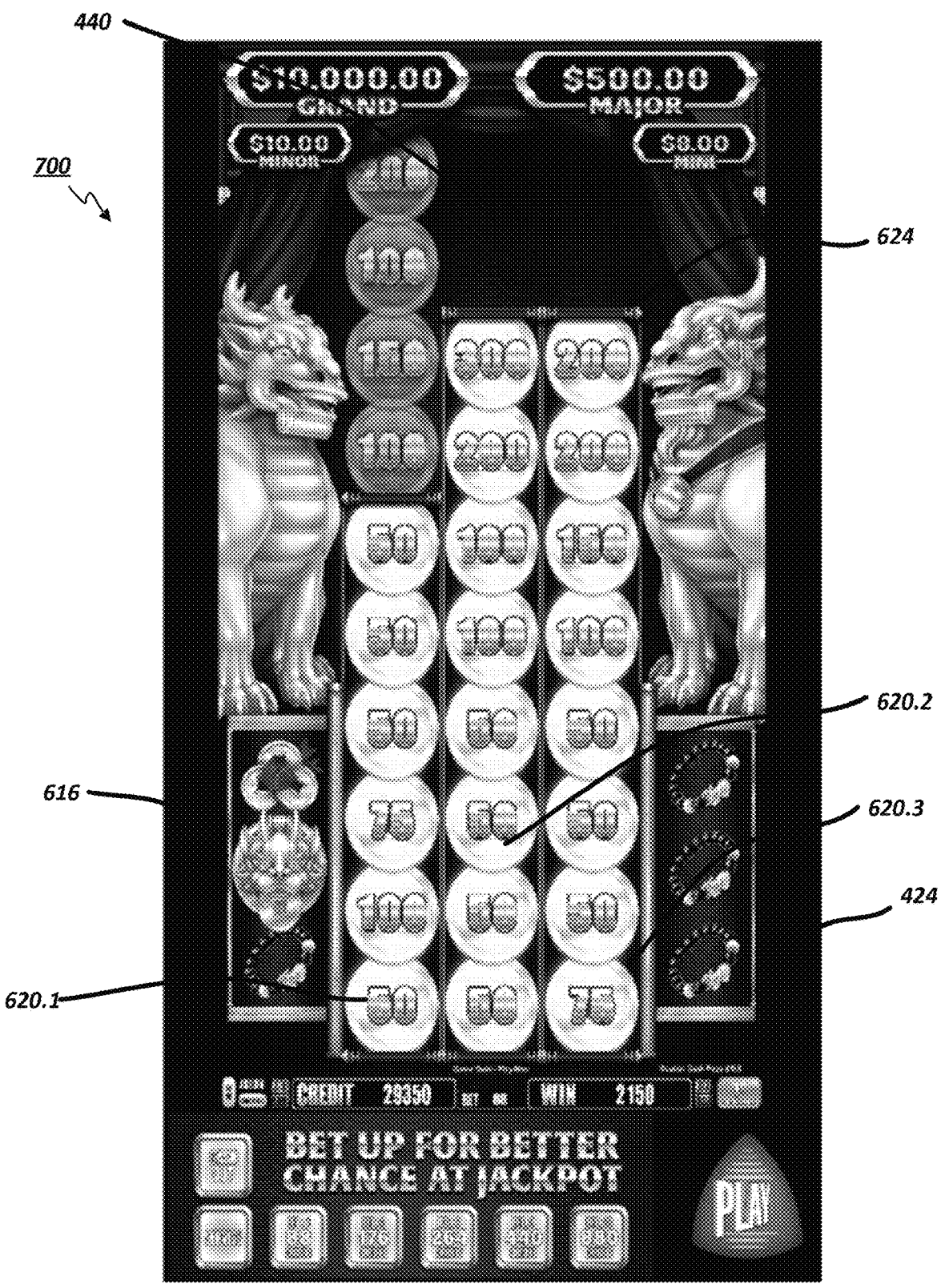
FIG. 7 illustrates a screenshot of a win of resulting from summing all of COR values on COR symbols displayed in an expanded matrix.

For example, as shown in FIG. 7, the "WIN" meter 432 displays a win of 2150 credits resulting from summing all of the COR values on the COR symbols displayed in the expanded active reel matrix 624. After awarding all reel power and COR wins, the expanded active reel matrix 624 remains on screen until a next paid spin is made during the operation, upon which the reels will swiftly return to the active reel matrix 404 (in a 34443-format) on start of reels spinning and before reel stops commence.

Figure 8:
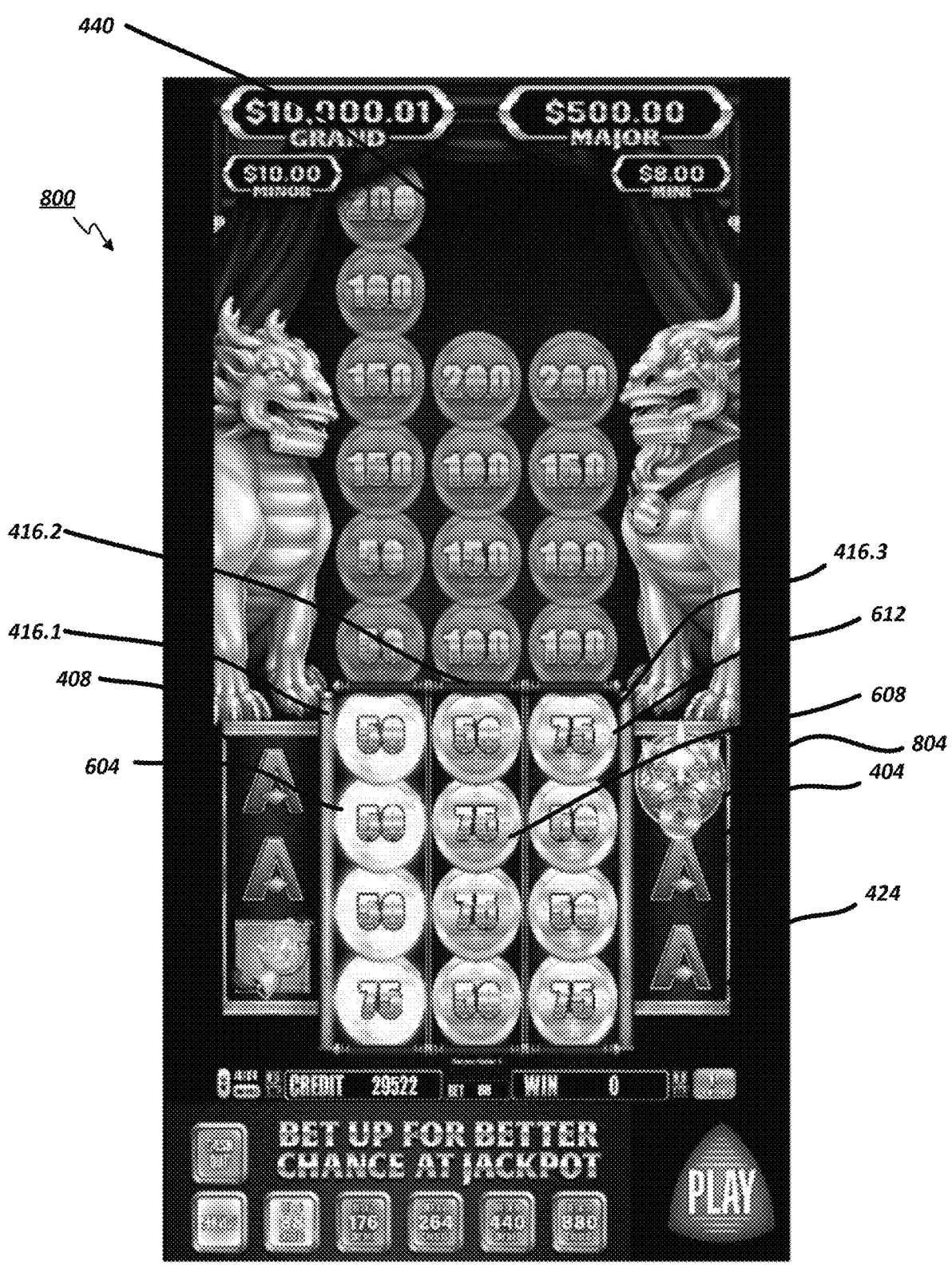
FIGS. 8 through 10 illustrate a series of screenshots of symbol stacks with COR symbols and all COR symbols being absorbed into a trigger symbol.
Figure 9:
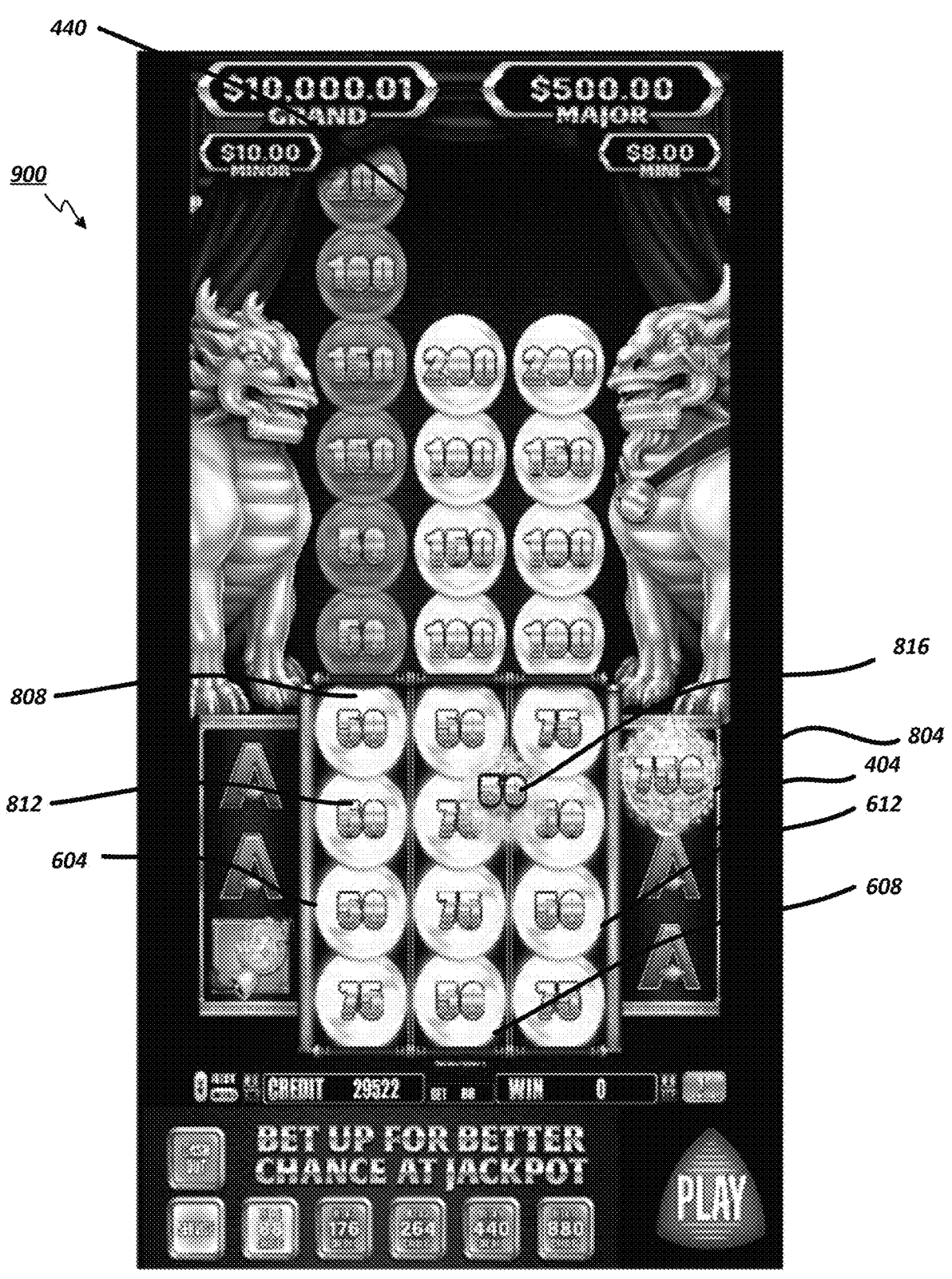
Figure 10:
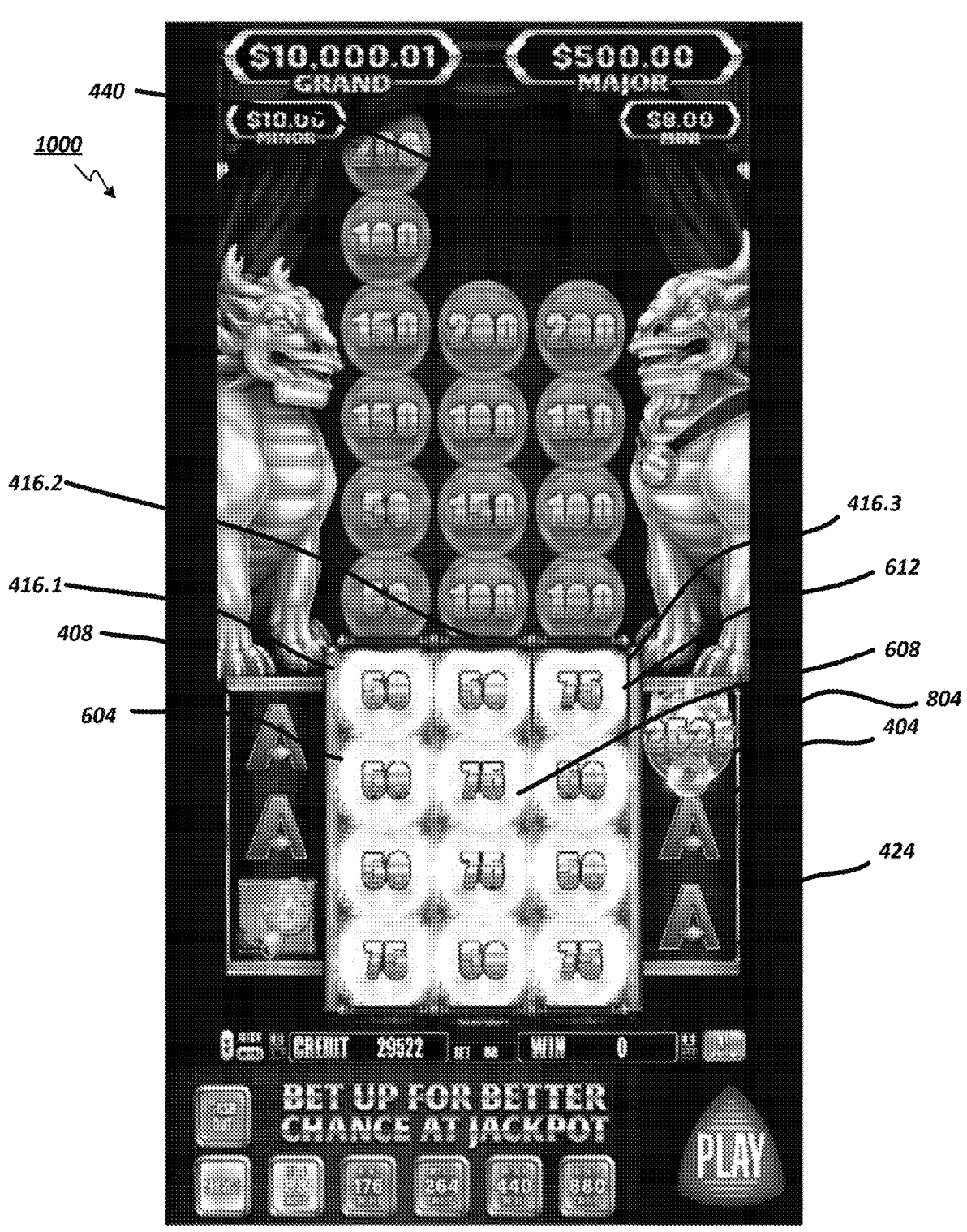

FIGS. 8 through 10 are screenshots 800, 900, and 1000 illustrating a super feature operation. In this operation, the processor (like the processor 204 of FIG. 2A) streams COR symbols from the stream space 440 into symbol stacks 604, 608, 612 of the active reel matrix 404 while some or all of the COR symbols are outside or external of the active reel matrix 404. In the embodiment shown, the processor (like the processor 204 of FIG. 2A), when a second trigger symbol 804 appears or lands in a reel (shown in FIG. 4 as the fifth reel 424) and when at least one COR symbol appears or is visible in the active reel matrix 404, the super feature is triggered. In this regard, triggering the super feature causes the processor (like the processor 204 of FIG. 2A) to initiate a symbol absorption or accumulation animation process. During the absorption process, the processor (like the processor 204 of FIG. 2A) animates all COR symbols, including the COR symbols in the active reel matrix 404 and the COR symbols external of the active reel matrix 404, to be highlighted, change to an active state, or otherwise emphasized for outcome evaluation.

By way of further example, as shown in FIG. 8, in addition to twelve COR symbols displayed in the active reel matrix 404, fourteen COR symbols are displayed adjacent or above the active reel matrix 404 in the stream space 440, specifically. The twelve COR symbols displayed in the active reel matrix 404, and the fourteen COR symbols displayed above the active reel matrix 404 in the stream space 440 are then rendered to active state for outcome evaluation.

Specifically, each of the COR symbols outside the active reel matrix 404 is successively evaluated and animated to move across the display to be absorbed into the second trigger symbol 804. In some embodiments, the processor (like the processor 204 of FIG. 2A) performs the absorption process to randomly determines an order in which the COR symbols are absorbed. In other embodiments, the processor (like the processor 204 of FIG. 2A) performs the absorption process employing a predetermined order of absorbing COR values of the COR symbols. In the embodiment shown, COR symbols are absorbed by animating the top left-most COR symbol to move across the display starting and into the trigger symbol and sequentially move down to animate each COR symbol in each of the central reels 416 before moving to a next reel.

In addition, in other embodiments, a near-miss or nudge feature may be included. For example, in FIG. 8, the processor 202 may permit a near-miss of the COR of 100 adjacent to active reel 416.2 or 100 adjacent to active reel 416.3 may be nudged into the active matrix (while another symbol is nudged out of the active reel matrix) to be included in an award, or the player may selectively nudge in the inactive symbol based on the occurrence of game condition. Such a symbol nudging feature may occur multiple times in one spin or multiple times in a round of multiple spins, and more than one qualifying symbol may be nudged into the active reel matrix 404. Such a near-miss or nudging feature adds the ability to further change the active reel matrix 404, and even after there has been a reel expansion or after the reels have stopped spinning, for example. The restricted display space available on EGMs typically makes such symbols changes to the active reel matrix 404 advantageous to game outcome variety and provides a beneficial, efficient game display presentation.

FIG. 9 illustrates that COR values of the COR symbols above the left central reel 416.1 and a first COR symbol 808 have been evaluated and absorbed into the second trigger symbol 804. As shown in this illustration, the trigger symbol 804 has absorbed and displays 750 credits. In this regard, the COR symbols above the left central reel 416.1 return to an inactive state, e.g., by non-highlighting the COR symbols. However, after the COR value has been absorbed into the second trigger symbol 804, the first COR symbol 808 will remain highlighted.

Also as shown, a second COR value of 50 credits on a second COR symbol 812 is animated to move from the second COR symbol 812 via an intermediate moving symbol 816 to animate the absorption into the second trigger symbol 804. All the symbols displayed in the active reel matrix 404 are evaluated for any reel power symbol combinations. The "WIN" meter 432 is then updated based on outcomes the processor (like the processor 204 of FIG. 2A) determines from the outcome evaluations. The outcomes may include the values that the trigger symbol 804 has absorbed. In the embodiment shown in FIG. 10, the processor (like the processor 204 of FIG. 2A) terminates the absorption process and the second trigger symbol 804 shows 2525 credits absorbed.

In a further embodiment, the processor (like the processor 204 of FIG. 2A) may trigger a number of free games when at least one bonus symbol appears on any of the left central reel 416.1, the middle central reel 416.2, and the right central reel 416.3 with respective base pay. In this regard, the processor may provide for a number of free games that may be predetermined, randomly selected, or determined based on other factors such as wagers, trigger events, or trigger symbols.

In some other embodiments, the processor may retrigger an additional number of free games during subsequent spins. For example, when in a free game mode, all features described above may be eligible in the free games and function as in the base game, with one or more exceptions for the expansion process. For example, if a plurality of free games are determined in an expanded active reel matrix spin, the expanded active reel matrix (similar to the expanded active reel matrix 624 of FIG. 6) may be carried over into the free game mode, and a first spin of the free game mode starts with the expanded active reel matrix. Play of the expanded active reel matrix continues through each successive free game until there are no more free games, or until a successive trigger symbol on the first reel 408 causes the processor (like the processor 204 of FIG. 2A) to continue expansion of the reels based on math tables, for example, up to a maximum matrix of 38883-format in this embodiment based on it display configuration.

Figure 11:
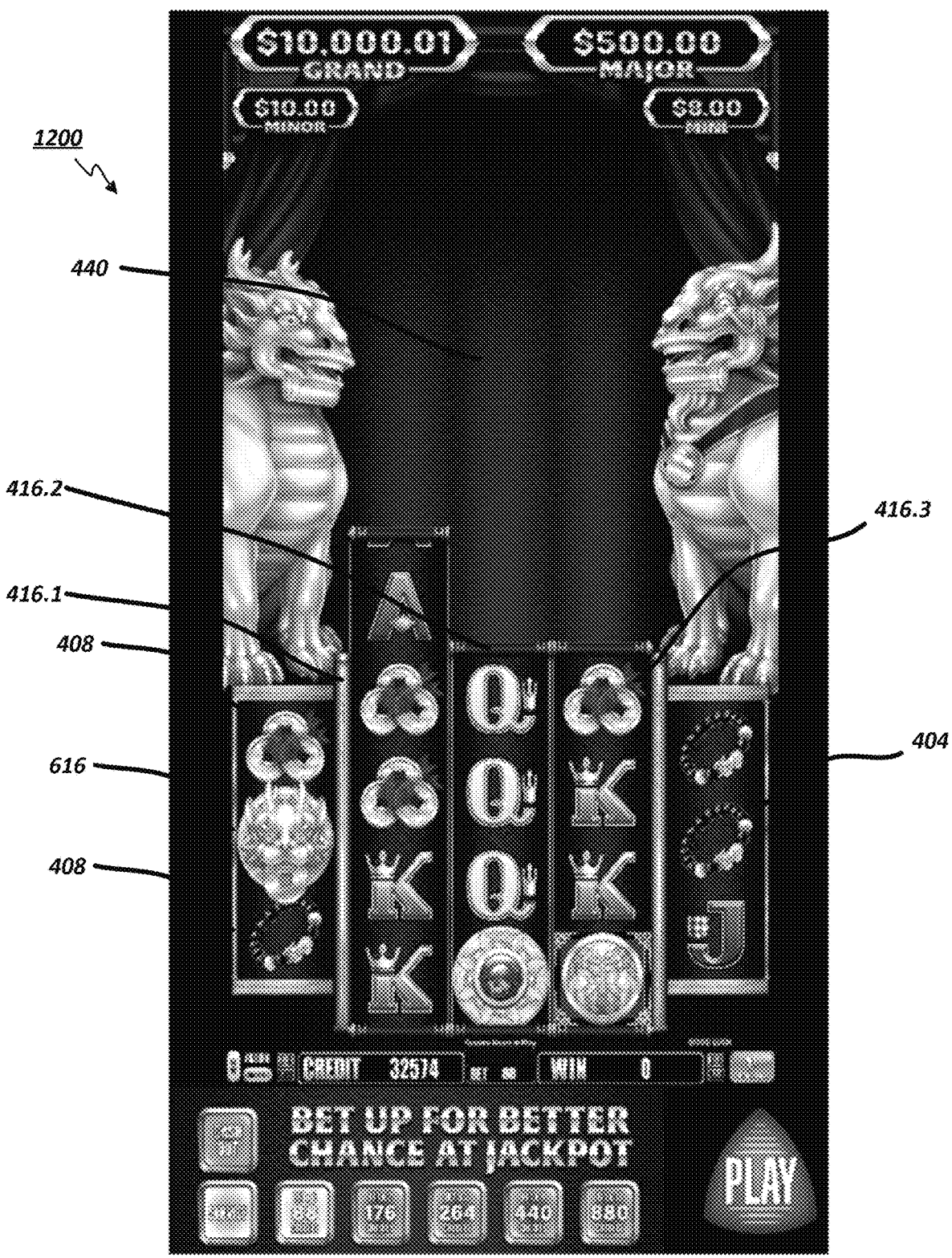
FIGS. 11 through 13 illustrate a series of screenshots of symbol stacks with COR symbols being streamed from a stream space into an expanding matrix and all COR symbols being absorbed into a trigger symbol in a super expansion absorption process.
Figure 12:
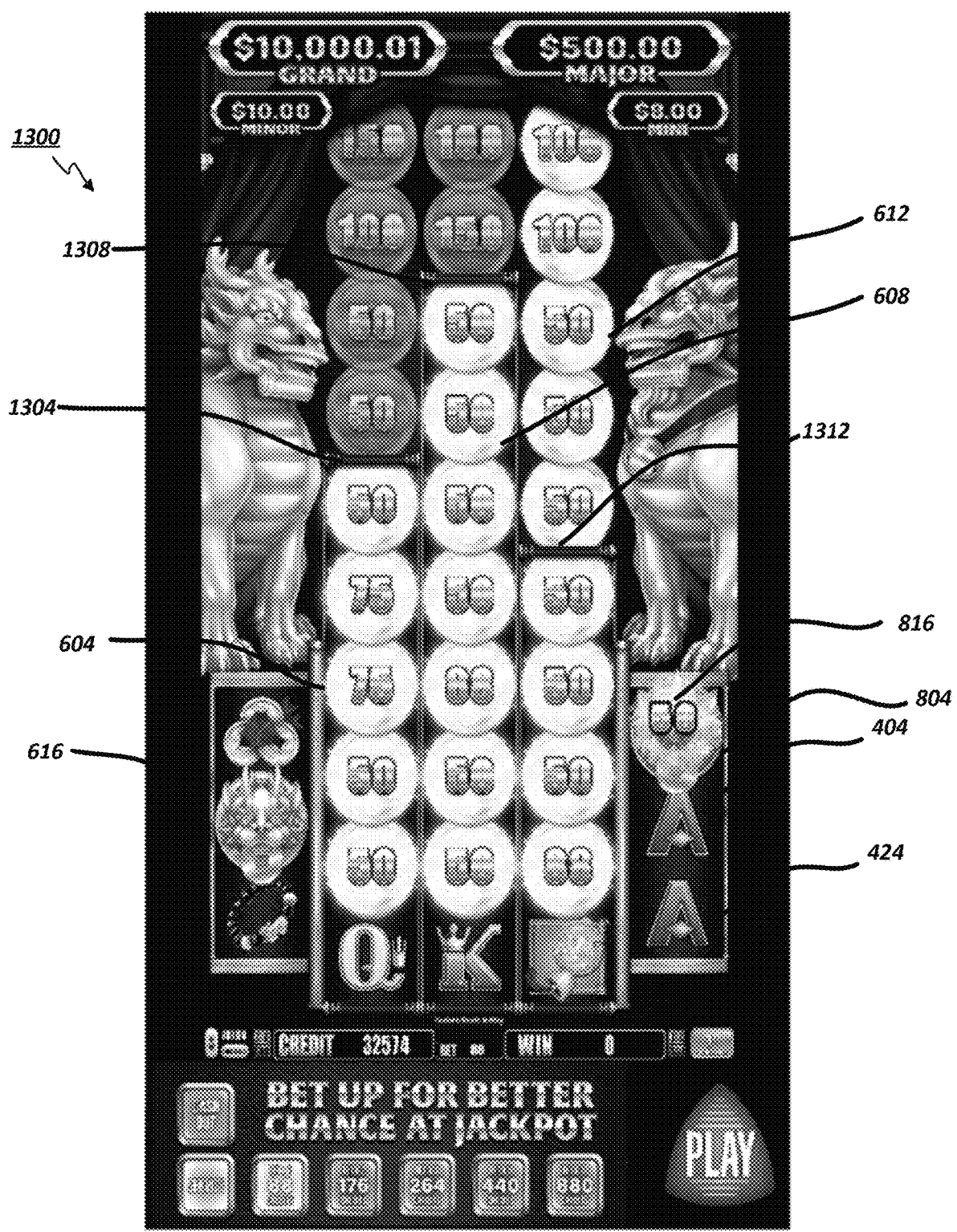
Figure 13:
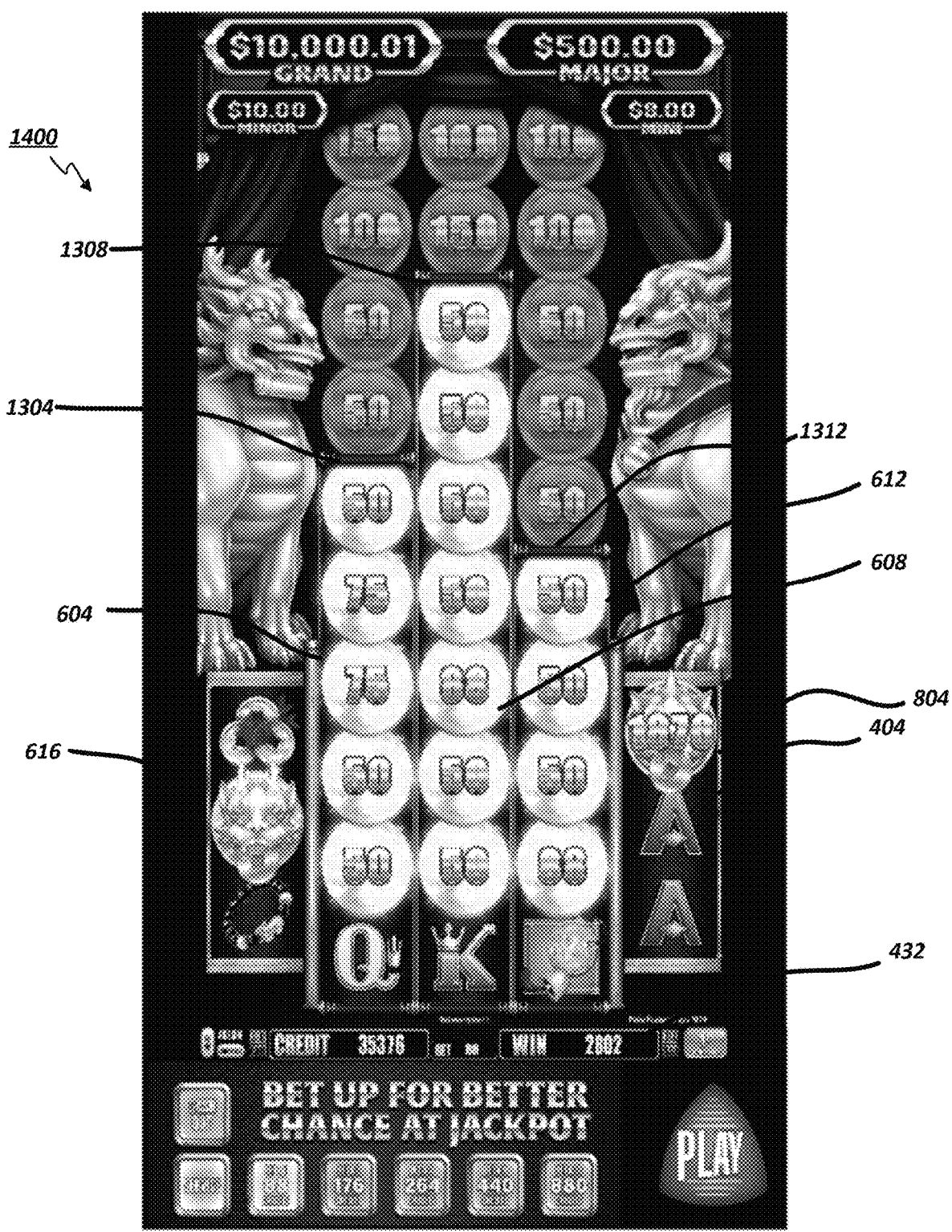

FIGS. 11 through 13 illustrate a series of screenshots of a super expansion absorption process 1200, 1300, 1400. As shown in FIG. 11, the first trigger symbol 616 appears in the first reel 408, which in turn initiates the expansion process of the central reels 416 as described with respect to FIG. 6. In the embodiment shown, the left central reel 416.1 starts to expand from four display positions to five display positions, and eventually six display positions 1304 as illustrated in FIG. 12. FIG. 12 also shows that the second trigger symbol 804 appears in the fifth reel 424, and the middle central reel 416.2 and the right central reel 416.3 have been expanded to include eight display positions 1308 and five display positions 1312, respectively. An expansion win is then determined from the COR symbols displayed in the expanded active reel matrix 404. In the embodiment shown, the expansion win is determined to be 926 credits.

The appearance of the second trigger symbol 804 also initiates the absorption process similar to the absorption process described with respect to FIG. 8. For example, the COR symbols external or outside of the active reel matrix 404 and in the active reel matrix 404 are activated or highlighted. All COR values of the COR symbols displayed are then successively moved to be absorbed by the second trigger symbol 804. After the COR values of the COR symbols displayed external or outside of the active reel matrix 404 have been absorbed, the COR symbols are deactivated or un-highlighted. As shown, the second trigger symbol 804 has absorbed 1876 credits, which are then added to all wins. In the embodiment shown in FIG. 13, the absorption win plus the expansion win therefore result in 2802 credits being displayed in the "WIN" meter 432.

Figure 14:
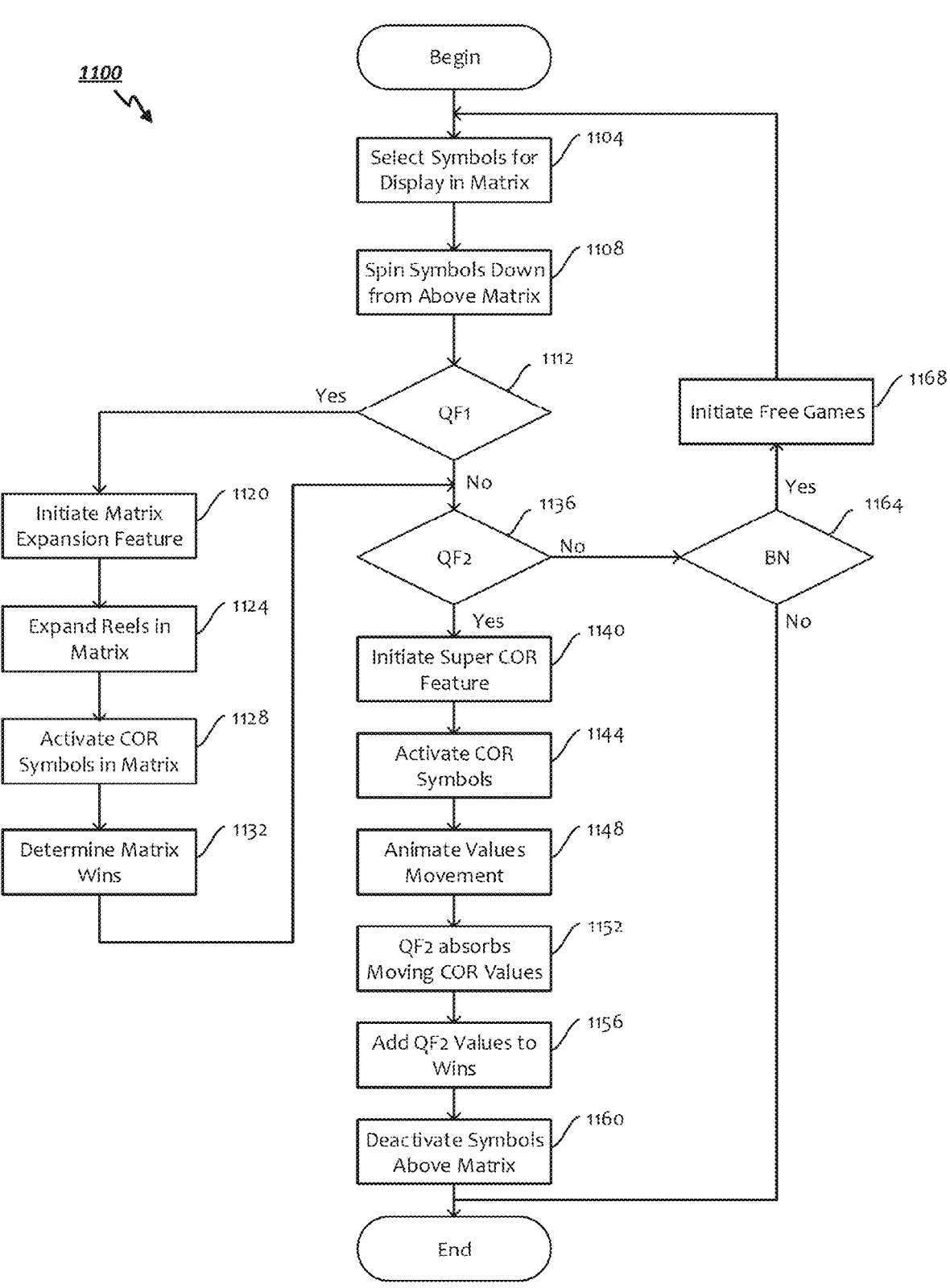
FIG. 14 illustrates an exemplary process flow chart in accordance with various implementations described herein.

FIG. 14 illustrates a flowchart of a feature process 1100. At step 1104, symbols are randomly selected based on a random number generated by a random number generator (similar to the RNG 212 of FIG. 2). At step 1108, additional COR symbols are spinning down from the stream space 440 as described above with respect to FIG. 4. At step 1112, the feature process 1100 determines if a first qualifying feature (QF1), e.g., a first trigger symbol, appears in the first reel 408.

If it is determined that the first qualifying feature symbol (QF1) appears in the first reel 408 (the "Yes" path), the feature process 1100 proceeds to initiate a matrix expansion feature (similar to the matrix expansion process described with respect to FIG. 6) at step 1120. At step 1124, the central reels 416 are expanded to include more of the COR symbols in the stream space 440 as described above with respect to FIG. 6. At step 1128, COR symbols in the active reel matrix 404 are activated or highlighted. The total COR values displayed in the highlighted COR symbols in the active reel matrix 404 are summed to obtain a win value at step 1132.

If it is determined that a second qualifying feature symbol (QF2), e.g., a second trigger symbol, appears in the fifth reel 424 at step 1136, the feature process 1100 proceeds to initiate the absorption process as described with respect to FIG. 8 at step 1140. At step 1144, the feature process 1100 activates or highlights all COR symbols in the active reel matrix 404 and above the active reel matrix 404. At step 1148, the feature process 1100 animates a COR value movement from an activated COR symbol to be absorbed by the second qualifying feature symbol (QF2), similar to the absorption process as described in FIG. 9. At step 1152, the COR value that has been moved is subsequently absorbed by the second qualifying feature symbol (QF2). After the COR value has been added to the second qualifying feature symbol (QF2) at step 1156, the COR symbol is deactivated or un-highlighted if the COR symbol is above the active reel matrix 404. In some embodiments, the feature process 1100 may also evaluate symbols displayed in the active reel matrix 404 for any awards or winning combinations.

As shown, when both the first qualifying feature symbol (QF1) (the "Yes" path of step 1112) and the second qualifying feature symbol (QF2) (the "Yes" path of step 1136) appear, the feature process 1100 enters a super expansion absorption process that includes both the matrix expansion process as described with respect to FIG. 6, and the absorption process as described with respect to FIG. 8, and similar to the super expansion absorption process illustrated with respect to FIGS. 11, 12, and 13.

If the feature process 1100 determines that the first qualifying feature (QF1) and the second qualifying feature (QF2) do not appear, the feature process 1100 proceeds to determine if the active reel matrix 404 displays a bonus symbol or a free game symbol at step 1164. If the feature process 1100 determines that the active reel matrix 404 displays a bonus symbol or a free game symbol at step 1164, the feature process 1100 initiates the free games at step 1168 and repeats step 1104.

In various example embodiments, values of various COR symbols are predefined. In various example embodiments, values of various COR symbols is selected prior to each play or instance of a game, including any base game or feature game. Values may be selected from a predetermined range or set of values, randomly assigned, etc. In other embodiments, the values of various COR symbols may be dynamically determined during an instance of a game. In still other embodiments, some of the values of COR symbols may be dynamically determined, while other values of COR symbols are predefined during an instance of a game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:
   a display device having a space adjacent to an active reel matrix; and
   a controller having a processor and memory storing a pay table, a set of game symbols including a plurality of trigger symbols, and a set of configurable symbols having a plurality of values, respectively, and instructions, which, when executed, cause the processor to at least:
   control the display device to display, in the active reel matrix, a plurality of game symbols selected from the set of game symbols based on one or more random numbers generated by a random number generator,
   animate in the space a plurality of configurable symbols selected from the set of configurable symbols, in an inactive state, moving from the space into at least a portion of the active reel matrix, the plurality of configurable symbols replacing some or all of the plurality of game symbols in the portion of the active reel matrix,
   activate the plurality of configurable symbols in the active reel matrix dynamically, animate, when the active reel matrix includes a second trigger symbol, the plurality of configurable symbols displayed in the space being activated dynamically, and the values of the plurality of configurable symbols activated being displayed as being absorbed into the second trigger symbol, and access the pay table to evaluate whether an award exists based on the second trigger symbol with the values absorbed, and the plurality of configurable symbols in the active reel matrix.

2. The electronic gaming device of claim 1, wherein the instructions, when executed, further cause the processor to control the display device to expand the portion of the active reel matrix, when the plurality of game symbols selected include a first trigger symbol, to include one or more of the plurality of configurable symbols displayed in the space in the active reel matrix.

3. The electronic gaming device of claim 1, wherein the plurality of configurable symbols in the space are partially visible before being activated in the active reel matrix.

4. The electronic gaming device of claim 1, wherein the active reel matrix comprises a plurality of reels, and the space comprises a plurality of symbol stacks corresponding to the plurality of reels, respectively.

5. The electronic gaming device of claim 4, wherein the instructions, when executed, further cause the processor to form a single reel from a first reel of the plurality of reels and a corresponding first symbol stack of the plurality of symbol stacks when the portion of the active reel matrix is expanded.

6. The electronic gaming device of claim 4, wherein the instructions, when executed, further cause the processor to stream the plurality of configurable symbols in the plurality of symbol stacks into the plurality of reels in a predetermined order, when the portion of the active reel matrix is expanded.

7. The electronic gaming device of claim 1, wherein the instructions, when executed, further cause the processor to assign an order of when the portion of the active reel matrix is expanded.

8. The electronic gaming device of claim 1, wherein the active reel matrix comprises a plurality of reels, and wherein the instructions, when executed, further cause the processor to determine a quantity of additional display positions for each of the plurality of reels when the portion of the active reel matrix is expanded.

9. A method of maintaining a return-to-player value while providing a plurality of feature games in an electronic gaming device having a display device having a space adjacent a plurality of reels, and a controller having a processor and memory storing a pay table, a set of game symbols including a plurality of trigger symbols, and a set of configurable symbols having a plurality of values, respectively, and instructions, which, when executed, cause the processor to initiate a game, the method comprising:

controlling the display device to display to animate in the plurality of reels a plurality of game symbols selected from the set of game symbols based on one or more random numbers generated by a random number generator;

controlling the display device to display to animate a first movement of a plurality of configurable symbols selected from the set of configurable symbols from the space into at least one reel of the plurality of reels replacing some or all of the plurality of game symbols in the at least one reel of the plurality of reels, and activating the plurality of configurable symbols in the plurality of reels;

expanding one or more reels of the plurality of reels, when the plurality of game symbols selected include a first trigger symbol, to include one or more of the plurality of configurable symbols in the plurality of reels, activating the plurality of configurable symbols in the plurality of reels dynamically;

activating, when the plurality of game symbols selected include a second trigger symbol, the plurality of configurable symbols displayed in the space dynamically;

controlling the display device to animate a second movement of the values of the plurality of configurable symbols activated to be accumulated into the second trigger symbol; and accessing the pay table in the memory to evaluate if an award exists in the plurality of reels.

10. The method of claim 9, wherein the space comprises a plurality of symbol stacks corresponding to the plurality of reels, respectively.

11. The method of claim 10, further comprising forming a single reel from a first reel of the plurality of reels and a corresponding first symbol stack of the plurality of symbol stacks when the one or more reels of the plurality of reels are expanded.

12. The method of claim 10, further comprising streaming the plurality of configurable symbols in the plurality of symbol stacks into the plurality of reels in a predetermined order.

13. The method of claim 9, further comprising determining a quantity of additional display positions for each of the one or more reels of the plurality of reels when the one or more reels of the plurality of reels are expanded.

14. A non-transitory computer-readable medium comprising storing a pay table, a set of game symbols including a plurality of trigger symbols, a set of configurable symbols having a plurality of values, and instructions, for conducting a game on a gaming system including a display device operable to provide a space adjacent an active reel matrix, and one or more processors, and the instructions, which, when executed, cause the one or more processors to perform the steps of:

populating in the active reel matrix with a plurality of game symbols selected from the set of game symbols based on one or more random numbers generated via a random number generator;

populating the space with a plurality of configurable symbols selected from the set of configurable symbols;

animating the plurality of configurable symbols in the space moving from the space into the active reel matrix;

expanding the active reel matrix, when the plurality of game symbols selected include a first trigger symbol, to include one or more of the plurality of configurable symbols populated in the space in the active reel matrix;

accumulating, when the active reel matrix includes a second trigger symbol, the values of the plurality of configurable symbols into the second trigger symbol; and controlling the display device to display an award evaluated based on the second trigger symbol with the values absorbed, and the plurality of configurable symbols in the active reel matrix.

15. The non-transitory computer-readable medium of claim 14, wherein the plurality of configurable symbols in the space are partially visible before being activated.

16. The non-transitory computer-readable medium of claim 14, wherein the active reel matrix comprises a plurality of reels, and the space comprises a plurality of symbol stacks corresponding to the plurality of reels, respectively.

17. The non-transitory computer-readable medium of claim 16, wherein the instructions, when executed, further cause the one or more processors to perform the step of forming a single reel from a first reel of the plurality of reels and a corresponding first symbol stack of the plurality of symbol stacks when the active reel matrix is expanded.

18. The non-transitory computer-readable medium of claim 16, wherein the instructions, when executed, further cause the one or more processors to perform the step of streaming the plurality of configurable symbols in the plurality of symbol stacks into the plurality of reels in a predetermined order when the active reel matrix is expanded.

19. The non-transitory computer-readable medium of claim 14, wherein the instructions, when executed, further cause the one or more processors to perform the step of assigning an order in which each of a plurality of reels is streamed into the active reel matrix is expanded.

20. The non-transitory computer-readable medium of claim 14, wherein the active reel matrix comprises a plurality of reels, and wherein the instructions, when executed, further cause the one or more processors to perform the step of determining a quantity of additional display positions for each of the plurality of reels when the active reel matrix is expanded.

* * * * *